United States Patent
Pierson et al.

(10) Patent No.: US 9,541,308 B2
(45) Date of Patent: Jan. 10, 2017

(54) SOLAR ROOFING SYSTEM

(75) Inventors: John L. Pierson, Chesterland, OH (US); Brian Lambert, Strongsville, OH (US)

(73) Assignee: Garland Industries, Inc., Cleveland, OH (US)

(*) Notice: Subject to any disclaimer, the term of this patent is extended or adjusted under 35 U.S.C. 154(b) by 987 days.

(21) Appl. No.: 12/724,574

(22) Filed: Mar. 16, 2010

(65) Prior Publication Data

US 2010/0236542 A1 Sep. 23, 2010

Related U.S. Application Data

(60) Provisional application No. 61/187,415, filed on Jun. 16, 2009, provisional application No. 61/184,984, filed on Jun. 8, 2009, provisional application No. 61/161,252, filed on Mar. 18, 2009.

(51) Int. Cl.
| | | |
|---|---|---|
| *F24J 2/52* | (2006.01) | |
| *F24J 2/04* | (2006.01) | |
| *H02S 20/23* | (2014.01) | |
| *F24J 2/46* | (2006.01) | |

(52) U.S. Cl.
CPC .............. *F24J 2/5245* (2013.01); *F24J 2/045* (2013.01); *H02S 20/23* (2014.12); *F24J 2002/4659* (2013.01); *F24J 2002/4676* (2013.01); *Y02B 10/12* (2013.01); *Y02B 10/20* (2013.01); *Y02E 10/44* (2013.01); *Y02E 10/47* (2013.01); *Y10T 29/53* (2015.01); *Y10T 29/53113* (2015.01)

(58) Field of Classification Search
USPC ...... 52/173.3, 461, 463, 466, 467, 468, 772, 52/465; 136/244; 126/623; 165/48.2
See application file for complete search history.

(56) References Cited

U.S. PATENT DOCUMENTS

| | | | | |
|---|---|---|---|---|
| 2,855,871 | A | * | 10/1958 | Huntington ...................... 52/461 |
| 3,063,201 | A | * | 11/1962 | Rylander ........................ 52/466 |
| 3,459,597 | A | | 8/1969 | Baron |
| 4,189,881 | A | * | 2/1980 | Hawley ........................ 52/91.3 |
| 4,193,820 | A | | 3/1980 | Thomas |
| 4,334,120 | A | | 6/1982 | Yamano |
| 4,433,200 | A | | 2/1984 | Jester |
| 4,485,264 | A | | 11/1984 | Isu |
| 4,537,838 | A | | 8/1985 | Jetter |
| 4,574,160 | A | | 3/1986 | Cull |
| 4,636,577 | A | * | 1/1987 | Peterpaul ...................... 136/206 |
| 4,636,578 | A | | 1/1987 | Feinberg |
| 4,636,579 | A | | 1/1987 | Hanak |
| 4,649,684 | A | * | 3/1987 | Petree et al. .................... 52/395 |

(Continued)

FOREIGN PATENT DOCUMENTS

| | | |
|---|---|---|
| DE | 298 24045 | 3/2000 |
| EP | 111394 | 6/1984 |

(Continued)

OTHER PUBLICATIONS

Lumeta PowerPly Brochure dated 2008.

(Continued)

*Primary Examiner* — Jessica Laux
(74) *Attorney, Agent, or Firm* — Fay Sharpe LLP

(57) ABSTRACT

An apparatus and method for connecting solar panels to a roof system surface. The solar panels can be formed flexible or non-flexible solar panels that are at least partially attached to a roofing surface by use of a fastener.

20 Claims, 4 Drawing Sheets

(56) References Cited

U.S. PATENT DOCUMENTS

| | | | |
|---|---|---|---|
| 4,674,244 A | 6/1987 | Francovitch | |
| 4,691,076 A | 9/1987 | Levine | |
| 4,860,509 A | 8/1989 | Laaly | |
| 4,886,554 A | 12/1989 | Woodring | |
| 5,092,939 A * | 3/1992 | Nath et al. | 136/251 |
| 5,164,020 A | 11/1992 | Wagner | |
| 5,232,518 A | 8/1993 | Nath | |
| 5,316,592 A | 5/1994 | Dinwoodie | |
| 5,409,549 A * | 4/1995 | Mori | 136/244 |
| 5,437,735 A | 8/1995 | Younan | |
| 5,482,569 A | 1/1996 | Ihara | |
| 5,505,788 A | 4/1996 | Dinwoodie | |
| 5,575,861 A | 11/1996 | Younan | |
| 5,590,495 A | 1/1997 | Bressler | |
| 5,746,839 A | 5/1998 | Dinwoodie | |
| 5,830,779 A | 11/1998 | Bressler | |
| 5,968,287 A | 10/1999 | Nath | |
| 5,990,414 A | 11/1999 | Posnansky | |
| 5,998,729 A | 12/1999 | Shiomi | |
| 6,050,042 A | 4/2000 | Durachko | |
| 6,061,978 A | 5/2000 | Dinwoodie | |
| 6,111,189 A | 8/2000 | Garvison | |
| 6,117,703 A | 9/2000 | Penndorf | |
| 6,148,570 A | 11/2000 | Dinwoodie | |
| 6,164,024 A * | 12/2000 | Konstantin | 52/200 |
| 6,182,403 B1 * | 2/2001 | Mimura et al. | 52/173.3 |
| 6,201,180 B1 | 3/2001 | Meyer | |
| 6,202,382 B1 * | 3/2001 | Conterno | 52/762 |
| 6,245,987 B1 | 6/2001 | Shiomi | |
| 6,268,559 B1 | 7/2001 | Yamawaki | |
| 6,269,596 B1 * | 8/2001 | Ohtsuka et al. | 52/173.3 |
| 6,295,818 B1 | 10/2001 | Ansley | |
| 6,354,045 B1 * | 3/2002 | Boone et al. | 52/95 |
| 6,380,477 B1 | 4/2002 | Curtin | |
| 6,384,314 B1 | 5/2002 | Lund-Hansen | |
| 6,421,966 B1 | 7/2002 | Braunstein | |
| 6,462,265 B1 | 10/2002 | Sasaoka | |
| 6,465,724 B1 | 10/2002 | Garvison | |
| 6,472,593 B1 | 10/2002 | Middelman | |
| 6,495,750 B1 | 12/2002 | Dinwoodie | |
| 6,501,013 B1 | 12/2002 | Dinwoodie | |
| 6,534,703 B2 | 3/2003 | Dinwoodie | |
| 6,553,729 B1 | 4/2003 | Nath | |
| 6,570,084 B2 | 5/2003 | Dinwoodie | |
| 6,617,507 B2 | 9/2003 | Mapes | |
| 6,670,541 B2 | 12/2003 | Nagao | |
| 6,675,580 B2 | 1/2004 | Ansley | |
| 6,729,081 B2 | 5/2004 | Nath | |
| 6,730,841 B2 | 5/2004 | Heckeroth | |
| 7,062,886 B2 * | 6/2006 | Auriemma | 52/506.07 |
| 7,313,893 B2 * | 1/2008 | Voegele, Jr. | 52/461 |
| 7,342,171 B2 | 3/2008 | Khouri | |
| 7,603,825 B2 * | 10/2009 | Dohren | 52/478 |
| 7,765,760 B2 * | 8/2010 | Konstantin | 52/466 |
| 2001/0045228 A1 | 11/2001 | Takada | |
| 2001/0054262 A1 | 12/2001 | Nath | |
| 2002/0043031 A1 | 4/2002 | Eguchi | |
| 2002/0046764 A1 | 4/2002 | Ansley | |
| 2002/0078991 A1 | 6/2002 | Nagao | |
| 2002/0129849 A1 | 9/2002 | Heckeroth | |
| 2003/0070368 A1 | 4/2003 | Shingleton | |
| 2003/0094193 A1 | 5/2003 | Mapes | |
| 2003/0116185 A1 | 6/2003 | Oswald | |
| 2003/0163964 A1 | 9/2003 | Elliott | |
| 2003/0217768 A1 | 11/2003 | Guha | |
| 2004/0144043 A1 | 7/2004 | Stevenson | |
| 2005/0072456 A1 | 4/2005 | Stevenson | |
| 2005/0178428 A1 | 8/2005 | Laaly | |
| 2005/0178429 A1 | 8/2005 | McCaskill | |
| 2007/0084501 A1 | 4/2007 | Kalberlah | |
| 2008/0053519 A1 | 3/2008 | Pearce | |
| 2008/0236653 A1 * | 10/2008 | Kelly | 136/251 |
| 2008/0245399 A1 | 10/2008 | DeLiddo | |
| 2008/0245404 A1 | 10/2008 | DeLiddo | |
| 2008/0245409 A1 | 10/2008 | Varghese | |
| 2010/0307084 A1 * | 12/2010 | Resso et al. | 52/302.1 |
| 2010/0307085 A1 * | 12/2010 | Resso et al. | 52/302.1 |

FOREIGN PATENT DOCUMENTS

| | | |
|---|---|---|
| EP | 1191605 | 3/2002 |
| EP | 1191606 | 3/2002 |
| EP | 1742274 | 1/2007 |
| GB | 2296263 | 6/1996 |
| JP | 11-22127 | 5/1989 |
| JP | 10-102687 | 4/1998 |
| WO | WO 84/00253 | 1/1984 |
| WO | WO 2004/066324 | 8/2004 |
| WO | WO 2006/098974 | 9/2006 |

OTHER PUBLICATIONS

Product brochure entitled: BIPV Solar Electric Roofing for Sustainable Buildings Brochure copyright 2006 Solar Integrated.
Product brochure entitled: North American BIPV copyright 2006 Solar Integrated.
Product brochure entitled: S1816G1 (SR2001A) Product Information Solar Panels: Built to Last and Generate Reliable Power—by Solar Integrated.
Product brochure entitled: S1744G1 (SR2004A) Product Information; Solar Panels: Built to Last and Generate Power by Solar Integrated.

* cited by examiner

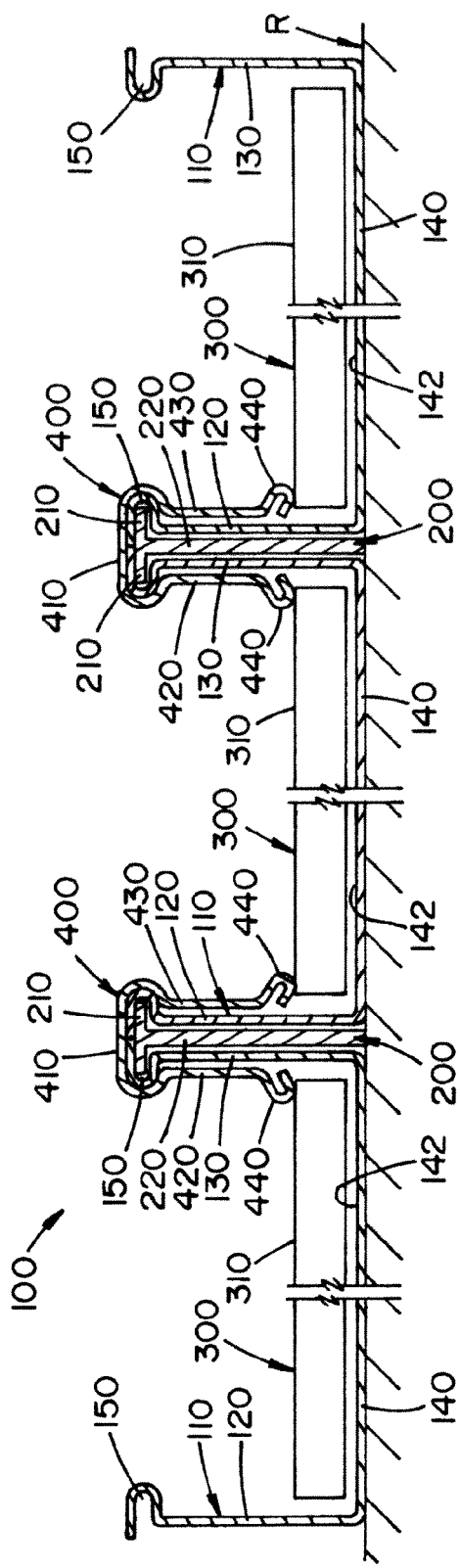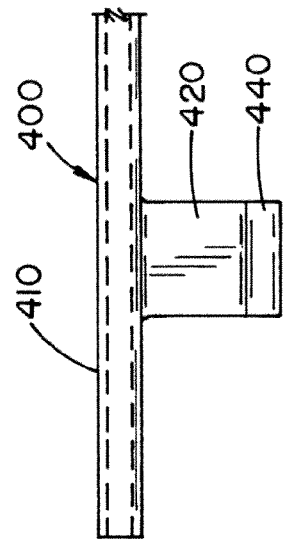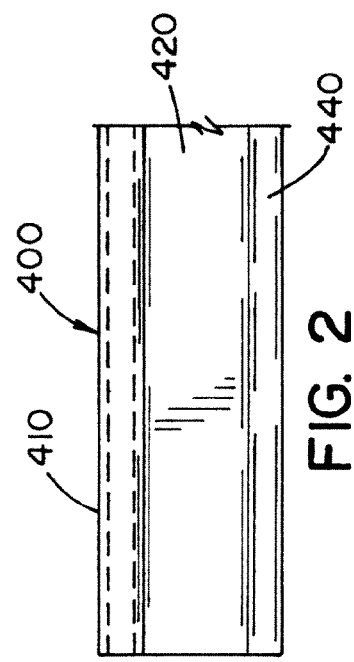

SOLAR ROOFING SYSTEM

The present invention claims priority on U.S. Provisional Application Ser. Nos. 61/187,415 filed Jun. 16, 2009; 61/184,984 filed Jun. 8, 2009; and 61/161,252 filed Mar. 18, 2009, all of which are incorporated herein by reference.

FIELD OF THE INVENTION

The present invention relates to solar panels, and generally to solar panels that can be connected to building structures.

BACKGROUND OF THE INVENTION

Rising energy costs, a public awareness to become more energy independent and environmentally friendly, and the reduction in the costs associated with solar panels has resulted in both consumers and commercial entities to consider retrofitting existing buildings with solar panels or to design new buildings that include solar panels. For instance, non-commercial and commercial owners and developers are increasingly considering alternative sources of energy to offset continued price increases of energy. As such, solar energy has received increased attention as an alternative renewable, non-polluting energy source to produce electricity as a substitute to other non-renewable energy resources.

One of the more popular means to generate energy for a building is solar power. Solar panels use a photovoltaic system that converts light energy into electricity. Some building structures have solar panels installed on their rooftops to obtain electricity generated from the sun. These solar panels can be installed on many types of roof systems as "stand alone" solar systems. Most solar panels are mechanically attached (e.g., bolts, screws, nails, rivets, etc.) to the top surface of a roof system. Furthermore, such solar panel systems typically require separate support structures that are typically bolted together to form an array of larger solar panels. The mounting arrays for such solar panels can require structural upgrades to the building due to added weight of the support structures and the solar panels. Additionally, these traditional mechanical arrangements for securing the solar panels to the roofing system require the forming of holes in the roof system surface and/or other modifications to the surface of the roof system that can impair the integrity of the roof surface. For instance, multiple penetrations of the roof membrane when installing the multiple solar panels can compromise the water-tightness of the roof system. Consequently, the water resistant or repellant properties of the roof system can be impaired when installing solar panels on a roof system. Furthermore, these mechanical connectors can become rusted and corroded overtime, thus becoming difficult to remove, thereby a) increasing the time and cost associated with the repair of the solar panel and/or b) increasing the incidence of damage to the solar panel, solar panel mounting arrangement and/or roofing system.

One common arrangement to connect solar panels to a roofing system without the need of traditional mechanical fasteners is the use of ballast blocks that are laid on a racking system for the solar panels. However, the use of ballast blocks adds significant weight to a roofing system, thus the use of ballast blocks cannot always be used on building structures when such building structures cannot support such added weight. In addition, the use of ballast blocks cannot be used on sloped roof surfaces, thus limiting the use of such arrangements to flat roofing systems.

Another solar panel attachment arrangement is disclosed in United States Patent Publication No. 2008/0245399 and 2008/0245404. A hook and loop connector (e.g., Velcro connector) is used to secure solar panels to a roof surface. Although such a connection arrangement at first appearance may seem appealing, there are many questions concerning whether such a connection arrangement can properly and successfully secure solar roofing panels to a roof surface overtime, especially in wind prone regions or on a sloped roof system.

In view of the current state of solar technology and roof systems, there is a continued need for a solar panel connector that easily, conveniently, and cost effectively connects solar panels to a roof system without damaging the roof system and/or the solar panels, which can be used on a roof systems without the need to modify or structurally enhance the roof system, and which can be used on sloped and non-sloped roof systems.

SUMMARY OF THE INVENTION

The present invention relates a connection arrangement to attach solar panels to a roofing system a building or other type of structure. More particularly, the invention relates to a connection arrangement and method for attaching one or more solar panels (e.g., photovoltaic panels) to the surface of a roofing system of a building or other type of structure. The connection arrangement of the present invention that is used to attach solar panels to the roofing system is designed to be used with metal roofing systems (e.g., standing seam metal roofing system, etc.). Indeed, the connection arrangement of the present invention can be used to attach many different types of solar panels to many different types of commercial and residential metal roof systems. The connection arrangement of the present invention can be used to attach many different types of solar panels (e.g., framed solar panels, thin film and flexible solar panels, etc.) to the siding system. Indeed, the connection arrangement of the present invention can be used to attach most, if not all, types solar panels to a roofing. The connection arrangement of the present invention is not dependent on the type of solar panel, the configuration of the solar panel, or the materials used to form the solar panel. The connection arrangement of the present invention used to attach solar panels to a roofing system of a building or other type of structure is designed to 1) be durable, 2) be lightweight, 3) be useable in many different types of weather conditions encountered by such systems, 4) require little or no modifications to the structure of an existing roofing system of a building or other type of structure, 5) be cost effective, and/or 6) be simple to install.

Many types of solar panels can be secured to a roofing system of a building or other type of structure by the connection arrangement in accordance with the present invention. One non-limiting type of solar panel that can be used is a solar panel formed of a reinforced single-ply membrane and a pattern of photovoltaic solar cells. Such solar cells are typically laminated to the membrane and encapsulated in a potting material; however, this is not required. The plurality of solar cells are typically interconnected by conductors with the inner rows being connected to the outer rows by bus bars at one end, and with the other ends terminating in parallel connection bars. Another known "combination" system for solar panels includes an integrated photovoltaic roofing component and panel that reduces the need for separate installers to handle roofing materials and solar and related electrical components. The integrated solar or photovoltaic roofing component and panel includes a flexible membrane sheet and a plurality of elongated solar or photovoltaic modules. The plurality of elongated photovoltaic modules are attached to a top surface of the flexible membrane sheet. Each module is arranged side-by-side or end to end such that the electrical leads are located at adjacent ends of the modules. As such, the wiring ends can be aligned with and/or adjacent to each other to form the integrated photovoltaic roofing component or panel. The electrical interconnections between individual solar cells of the solar module can be completed before the plurality of solar modules are adhered to the flexible membrane; however, this is not required. As a result, an installer may not be required to connect positive and negative electrodes of each individual solar cell, thereby reducing the electrical interconnections between all the solar cells and modules. As such, the integrated photovoltaic roofing panel can be unrolled onto a roof of a building structure and installed and properly connected with fewer electrical components and connections than conventional combination photovoltaic systems. The edges of the elongated solar modules can be encapsulated with a sealant; however, this is not required. The type, shape and/or composition of the solar panels that can be used in the present invention is non-limiting. It is believed that all types of solar panels can be used in the present invention. Non-limiting examples of solar panel arrangements, configurations and/or applications that can be used in the present invention are disclosed in U.S. Pat. No. 3,459,597; U.S. Pat. No. 4,189,881; U.S. Pat. No. 4,193,820; U.S. Pat. No. 4,334,120; U.S. Pat. No. 4,433,200; U.S. Pat. No. 4,485,264; U.S. Pat. No. 4,537,838; U.S. Pat. No. 4,574,160; U.S. Pat. No. 4,636,577; U.S. Pat. No. 4,636,578; U.S. Pat. No. 4,636,579; U.S. Pat. No. 4,674,244; U.S. Pat. No. 4,691,076; U.S. Pat. No. 4,860,509; U.S. Pat. No. 4,886,554; U.S. Pat. No. 5,092,939; U.S. Pat. No. 5,164,020; U.S. Pat. No. 5,232,518; U.S. Pat. No. 5,316,592; U.S. Pat. No. 5,437,735; U.S. Pat. No. 5,482,569; U.S. Pat. No. 5,505,788; U.S. Pat. No. 5,575,861; U.S. Pat. No. 5,590,495; U.S. Pat. No. 5,746,839; U.S. Pat. No. 5,830,779; U.S. Pat. No. 5,968,287; U.S. Pat. No. 5,990,414; U.S. Pat. No. 5,998,729; U.S. Pat. No. 6,050,042; U.S. Pat. No. 6,061,978; U.S. Pat. No. 6,111,189; U.S. Pat. No. 6,117,703; U.S. Pat. No. 6,148,570; U.S. Pat. No. 6,182,403; U.S. Pat. No. 6,201,180; U.S. Pat. No. 6,245,987; U.S. Pat. No. 6,268,559; U.S. Pat. No. 6,295,818; U.S. Pat. No. 6,380,477; U.S. Pat. No. 6,384,314; U.S. Pat. No. 6,421,966; U.S. Pat. No. 6,462,265; U.S. Pat. No. 6,465,724; U.S. Pat. No. 6,472,593; U.S. Pat. No. 6,495,750; U.S. Pat. No. 6,501,013; U.S. Pat. No. 6,534,703; U.S. Pat. No. 6,553,729; U.S. Pat. No. 6,570,084; U.S. Pat. No. 6,617,507; U.S. Pat. No. 6,670,541; U.S. Pat. No. 6,675,580; U.S. Pat. No. 6,729,081; U.S. Pat. No. 6,730,841; U.S. Pat. No. 7,342,171; United States Patent Publication Nos. US 2001/0045228; US 2001/0054262; US 2002/0043031; US 2002/0046764; US 2002/0078991; US 2002/0129849; US 2003/0070368; US 2003/0094193; US 2003/0116185; US 2003/0163964; US 2003/0217768; US 2004/0144043; US 2005/0072456; US 2005/0178428; US 2005/0178429; US 2007/0084501; US 2008/0053519; US 2008/0245399; US 2008/0245399; US 2008/0245404; US2008/0245409; Foreign Patent Nos. DE 298 24 045; EP 1856744; EP 1191606; EP 1191605; EP 1742274; EP 1588424; EP 111394; GB 2 296 263; JP 10-102687; JP 11-22127; WO 84/00253; all of which are fully incorporated herein by reference. The manufacture, operation and use of these solar panels are disclosed in detail in the above patents, patent applications and articles, thus such manufacture, operation and use of such solar panels will not be described herein in detail since such information is incorporated herein. The present invention enables various types of solar panels to be easily connected to and/or disconnected from various types of roof systems. As used in the present invention, the term "flexible solar panel" refers to any type of solar panel that is fully or semi-flexible. Generally, flexible solar panels are thin film systems; however, this is not required. As also used herein, the term "non-flexible solar panels" refers to any solar panel that a generally rigid structure. Generally non-flexible solar panels include one or more rigid plates of silica or glass that may or may be contained in a frame; however, it will be appreciated that such non-flexible solar panels can be formed of other or additional materials, and/or may or may not be framed. As also can be appreciated, some glass or crystalline type solar panels can be secured to a flexible backing (e.g., Lumeta PowerPly), thereby making such glass or crystalline type solar panels semi-flexible. For purposes of this invention, such solar panels are considered "flexible solar panels".

In another and/or alternative non-limiting embodiment of the present invention, the connection arrangement includes a mechanical connector that is designed to connect one or more solar panels to a roofing system of a building or other type of structure. In one non-limiting embodiment of the invention, the mechanical connector includes at least two components, namely 1) a first component that is designed to be connected to the roofing system of a building or other type of structure, and 2) a second component that is connectable to the first component and which may or may not be designed to be disconnected form the second component without causing the first component to be removed from the roofing system of a building or other type of structure and/or to damage the roofing system of a building or other type of structure when the second component is removed from the first component. As such, the two components of the mechanical connection arrangement may be removably connected together or irremovably connected together. The second component may or may not be removably connected to one or more of the solar panels. In one non-limiting aspect of this embodiment, the mechanical connection arrangement of the present invention includes a mushroom-type hook strip system and/or a hook and loop system (e.g., Velcro, etc.) that is designed to releasably connect one or more solar panels to a roof system of a building or other type of structure. In one non-limiting design, a mushroom-type hook strip system is used which includes one or more strips wherein the one or more strips may or may not include a flexible backing. As can be appreciated, the mushroom-type hook strip system can be the secondary or primary connection arrangement used to connect one or more solar panels to a roof system of a building or other type of structure. Generally, the mushroom-type hook strip system, when used, is used in combination with one or more other types of connection arrangements (e.g., Velcro—hook and loop fasteners, adhesives, nails, screws, rivets, staples, stitching, metal clips, snaps, clamps, etc.) to connect one or more solar panels to a roof system a building or other type of structure. The backing of the one or more strips of the mushroom-type hook strip system can be formed of many types of materials (e.g., wood, plastic, metal, fiberglass, composite materials, ceramic materials, thermoplastic resin, other types of polymers, reinforced and/or impregnated fabrics, etc.). Positioned on the top side of the backing of the strips is an array of upstanding stems distributed across the top side of the strip. A plurality of these upstanding stems include a generally mushroom head shape. Two strips of the mushroom-type hook strip system are designed to interengage one another when pressed together to thereby form a connectable mechanical connection arrangement. The distribution of the upstanding stems on the top side of the strip is typically selected such that there is generally equally spacing of the stems from one another (e.g., square or hexagonal array, etc.); however, this is not required. This type of orientation results in a reduced incidence of breakage of the stems when the strips are pressed together and/or pulled apart. The generally mushroom-head shape of the stems can have smooth, rounded outer surfaces, thus be more user friendly and less abrasive to the skin; however, this is not required. The generally mushroom-head shape of the stems generally have a uniform height and a substantially uniform spacing of from one another center to center; however, it can be appreciated that other heights and/or spacing of the stems can be used. The thickness and material of the stem can be selected to provide the desired flexibility or rigidity of the stem. Likewise, the thickness and material of the strip can be selected to provide the desired flexibility or rigidity of the strip. The mushroom-type hook strip system can be formed of a variety of materials such as, but not limited to, plastic (e.g, polypropylene, copolymer of polypropylene, polyethylene, resin materials, etc.), metal, ceramic materials, composite materials (fiber glass and resin materials, carbon fibers and resin materials, etc.), resin material, or a combination of one or more of these materials. In another non-limiting aspect of the present invention, the connection arrangement includes one or more adhesive strips secured to the bottom surface of a solar panel and/or one or more adhesive strips secure to a roof surface, roofing material, or some other structure that is connected to the roof surface. The one or more strips are generally used to irremovably connect a solar panel to a roof surface, roofing material, or some other structure that is connected to the roof surface; however, this is not required. In one non-limiting example, the one or more strips are an adhesive strip that includes an adhesive surface on one or both sides of the strip. Another non-limiting example of a strip of connection arrangement is a strip of material that is connected to the solar panel by use of an adhesive, melted bond, welded bond, solder bond, mechanical connection (e.g., rivet, sewn, stitched, nailed, clamped, etc.). The strip, when connected to the solar panel, is generally designed to be irremovably connected to the solar panel; however, this is not required. The strip may be a flexible or non-flexible material. The material used to form the strip is non-limiting (e.g., plastic, fabric, wood, metal, ceramic, composite material, etc.). The strip of adhesive tape can be partially or fully pre-applied to the solar panel and/or to the roofing system; however, this is not required. One or more sides of the adhesive tape can include a removable film or cover that protects the one or more adhesive surfaces of the adhesive tape; however, this is not required. When the film or cover is removed, the adhesive surface of the adhesive tape can be exposed; however, this is not required. The adhesive tape can have the top and/or bottom surface include an adhesive contact surface. When the adhesive tape has two adhesive sides, the type of adhesive on the two sides can be the same or different. The type of adhesive used on the adhesive tape is non-limiting. Generally, the adhesive used on the adhesive tape is a contact adhesive that forms a bond when pressed to a surface; however, this is not required.

In still another and/or alternative non-limiting embodiment of the present invention, when the connection arrangement includes one or more strips of material, the length, width and/or thickness of one or more strips is non-limiting. When a single strip is connected to the bottom surface of a solar panel, the single strip can be applied to the complete bottom surface of the solar panel, or to a portion of the bottom surface of the solar panel. In addition, the width of the strip can be greater, equal to or less than the width of the solar panel. Generally the single strip is irremovably connected to the bottom surface of the solar panel; however, this is not required. Likewise, when a plurality of strips are connected to the bottom surface of a solar panel, the plurality strips can be applied to the complete bottom surface of the solar panel or to a portion of the bottom surface of the solar panel. These strips are generally irremovably connected to the bottom surface of the solar panel; however, this is not required. In addition, the width of one or more of the strips can be greater, equal to or less than the width of the solar panel. Furthermore, the one or more strips that are connected to the bottom surface of the solar panel can extend beyond the edges of the solar panel; however, this is not required. If two are more strips are used, the strips can have the same or different length, width and/or thickness. The width and/or thickness of the strips can be the same or vary along the longitudinal length of the strip. The strips can be used with flexible solar panels and/or non-flexible solar panels. The strips can be used to attach solar panels directly to a roof surface, and/or to other structures that are connected to a roof surface. The one or more strips can be connected to the bottom surface of the solar panels by many means (e.g., adhesive or bonding materials, melt bond, rivets, staples, sewn connection, laminations, clamps, Velcro, mushroom connectors, etc.). The one or more strips can also or alternatively be connected to the roof surface or one more structures on the roof surface by many means (e.g., adhesive or bonding materials, melt bonded, rivets, laminations, staples, clamps, Velcro, mushroom connectors, etc.). Generally the one or more strips are that connected to the roof surface, or one more structures on the roof surface, when used, are connected at a location that coincides with the desired arrangement of solar panels on the roof system. The use of one or more strips to secure the solar panels to a roof system has several advantages such as, but not limited to, 1) creates a strong connection between the solar panels and the roofing system and/or siding system such that the solar panels can be connected to sloped and non-sloped roof systems, 2) creates a strong connection between the solar panels and the roofing system such that the solar panels can be connected to roof systems that exist in many types of environments (e.g., windy regions, warm regions, cold regions, tropical regions, etc.), 3) does not create significant added weight to a roof system, 4) allows for fast and simple installation of the solar panels on a roof system, and/or 5) can create an air space between the solar panels and the roofing system that can allow for heat dissipation so as to reduce the incidence of heat damage to the solar panels, and/or the roof system.

In still another and/or alternative non-limiting embodiment of the present invention, an adhesion platform can be applied to the solar panel and/or to the roofing system prior to securing one or more strips of connection material to the solar panel and/or to the roofing system; however, this is not required. The use of an adhesion platform on the roof surface, and/or on the bottom surface of the solar panel is optional. The adhesion platform when used, is used to enhance the strength of the bond between 1) the adhesion platform and a roof surface, 2) the adhesion platform and a solar panel, or 3) two adhesion platforms when an adhesion platform is connected to both the solar panel and a roof surface. The adhesion platform is generally one or more strips of material that are bonded to the roof surface, and/or on the bottom surface of the solar panel. The one or more strips of material of the adhesion platform can fully or partially cover the bottom surface of the solar panel and/or the top surface of a roof system. The type of material used to form the strip of adhesion platform is non-limiting. Generally, the adhesion platform is formed of wood, mesh material, fleece material, woven and/or non-woven material, metal material, ceramic material, fiber glass material, composite material, plastic material, polymer coating, plated material and/or some combination thereof. As can also be appreciated, the adhesion platform can be formed of a coating of one or more materials on the bottom surface of the solar panel and/or the top surface of a roof system. The adhesion platform can be secured and/or applied to the roof surface, and/or on the bottom surface of the solar panel by any number of arrangements. Non-limiting examples of securing arrangements include, but are not limited to, mechanical arrangements (e.g., nail, screw, bolt, clamp, rivet, staple, lock, snap, tongue and groove connection, etc.); welded or soldered connections; melted bonding; adhesive bonding (e.g., adhesives, bitumen coatings, modified bitumen coatings, coal tar and/or asphalt coatings, etc.); and/or combinations of any of these connection arrangements. When the adhesion platform is or includes a coating, non-limiting examples of coating process include, but are not limited to, plating; coating (e.g., dip coating, spray coating, air-knife, brush coating, etc.); and/or combinations of any of these connection arrangements. As can be appreciated, the connection arrangement that is used to connect one or more strips to the surface of the strip of adhesion platform can be the same or different from the connection arrangement used to secure the strip of adhesion platform to the roof surface and/or on the bottom surface of the solar panel. As can also be appreciated, the connection arrangement that is used to secure the one or more strips of adhesion platform to the roof surface and/or on the bottom surface of the solar panel can be 1) partially or fully pre-applied to the strip of adhesion platform, and/or 2) partially or fully pre-applied to roof surface and/or on the bottom surface of the solar panel; however, this is not required. As can also be appreciated, the connection arrangement that is used to secure to the one or more strips of adhesion platform to the one or more strips of connection arrangement can be 1) partially or fully pre-applied to the strip of adhesion platform, and/or 2) partially or fully pre-applied to the one or more strips of connection arrangement; however, this is not required. As can also be appreciated, the adhesion platform can be a modified portion of the bottom surface of a solar panel and/or a top surface of a roofing material that was formed during the manufacturing process of the solar panel and/or roofing material. As such, the adhesion platform in such instances may not necessarily be a strip of material on the solar panel and/or roofing material, but may instead be a specially prepared or modified region of the solar panel and/or roofing material that is designed to be connected to a) one or more strips of connection arrangement, b) another adhesion platform, c) directly to a solar panel, or d) directly to a roofing system. The strip of adhesion platform is not limited in shape, size, and/or thickness. In one non-limiting configuration, the thickness of the strip of adhesion platform is generally uniform; however, this is not required. The width of the strip of adhesion platform may be constant or may vary along the longitudinal length of the strip of adhesion platform. As can be appreciated, the width of the strip of adhesion platform can be the same as the width of the strip of connection arrangement that is be connected to the strip of adhesion platform. As can be appreciated, the width of the strip of adhesion platform can be the same as the width of the bottom surface of the solar panel that is be connected to the strip of adhesion platform. The strip of adhesion platform can be pre-applied to the roof surface and/or on the bottom surface of the flexible thin film solar panel and/or framed solar panel, or be applied on-site. When a strip of adhesion platform is to be applied to a pre-existing roofing system, the surface of the roofing system can be prepared (e.g., clean roof surface, remove granules from roof surface, etc.) prior to securing the strip of adhesion platform to the roof surface; however, this is not required. When new roofing material is to be applied to a new or pre-existing roof system, the new roofing material may or may not include a pre-existing strip of adhesion platform.

In still yet another and/or alternative non-limiting embodiment of the present invention, a roofing material that can be used to secure a flexible and/or non-flexible solar panel to the top surface of the roofing material can be at least partially formed from a metal roofing and/or siding system. One or more adhesion platforms can be formed on and/or are connected to the top surface of the roofing material; however, this is not required.

In yet another and/or alternative non-limiting embodiment of the present invention, there is provided a pre-manufactured roofing material that includes a top surface having highly reflective properties has a effective reflectivity of at least about 55%, typically at least about 60%, more typically at least about 65%, and even more typically about 70-99.9%. The top surface of such roofing material can include a) one or more strips of adhesion platform, b) one or more strips of connection arrangement, and/or c) one or more solar panels that are secured to the top surface of the roofing material. The a) one or more strips of adhesion platform, b) one or more strips of connection arrangement, and/or c) one or more solar panels can be partially or fully applied during the manufacturing of the roofing material, and/or can be partially or fully applied prior to, during and/or after the installation of the roofing material on a roof system.

In still yet another and/or alternative non-limiting embodiment of the present invention, a solar panel that is to be installed on a roof of a building can be pre-manufactured to include 1) a prepared surface that is designed to receive a connection arrangement (e.g, strip of adhesion platform, adhesive strip, etc), 2) a prepared surface that includes a removable cover or film, which prepared surface is designed to receive a connection arrangement (e.g, strip of adhesion platform, adhesive strip, etc.), 3) a pre-applied strip connection arrangement (e.g., adhesive strip, etc.), 4) a pre-applied strip of adhesion platform, or 5) a pre-applied strip of strip of adhesion platform, which adhesion platform includes a pre-applied strip of connection arrangement (e.g., adhesive strip, etc.). The pre-manufactured solar panel can be a flexible solar panel that is rolled-up into a roll for easy transport to the location of installation; however, this is not required. The manufacturing process for making a modified solar panel is non-limiting. In one non-limiting manufacturing process, the one or more strips of adhesion platform and/or one or more strips of connection arrangement are applied to the bottom surface of the solar panel by 1) applying the one or more strips to the warm or hot bottom surface of the solar panel to form a heat bond between the one or more strips and the bottom surface of the solar panel, 2) applying the one or more strips to the bottom surface of the solar panel, which bottom surface of the one or more strips includes an adhesive or other type of bonding agent, to form a bond between the one or more strips and the bottom surface of the solar panel, 3) applying the one or more strips to the bottom surface of the solar panel, which bottom surface of the solar panel includes an adhesive or other type of bonding agent, to form a bond between the one or more strips and the bottom surface of the solar panel, 4) applying the one or more strips to the bottom of the solar panel, which bottom surface of the one or more strips includes an adhesive or other type of bonding agent and the bottom surface of the solar panel includes an adhesive or other type of bonding agent, to form a bond between the one or more strips and the bottom surface of the solar panel, 5) mechanically connecting one or more strips to the bottom of the solar panel by use of one or more mechanical connection arrangements (e.g., nails, screws, rivets, staples, stitching, clips, snaps, clamps, etc.), and/or 6) connecting one or more strips to the top surface of the roofing and/or siding material by use of a melted bond, welded bond, or solder bond to form a connection between the one or more strips and the bottom surface of the solar panel. In one non-limiting manufacturing process, a removable protective film or cover can be applied to one or more portions of the bottom surface of the solar panel so as to protect such region of the solar panel until one or more strips of adhesion platform, and/or strips of connection arrangement are to be applied to the bottom surface of the solar panel; however, this is not required. The removal or the film or cover and subsequent connection of the one or more strips of adhesion platform, and/or one or more strips of connection arrangement can occur at the manufacturing site of the solar panel, or can occur at a location remote from the manufacturing site (e.g., on-site at the location of the roofing system of a building, etc.). In any of the non-limiting manufacturing processes described above, heat and/or pressure (e.g, pressure rollers, etc.) can be used to facilitate in forming a bond between the one or more strips and the solar panel.

In another and/or alternative non-limiting embodiment of the present invention, there is provided a pre-manufactured flexible solar panel wherein one or more photovoltaic cells are secured to the top surface of a highly reflective material, which highly reflective material has a has a resulting or effective reflectivity of at least about 55%, typically at least about 60%, more typically at least about 65%, and even more typically about 70-99.9%. The highly reflective material is generally a light colored material such as, but not limited to, a white colored material. The highly reflective material can include polyvinylidene fluoride; however, this is not required.

In still another and/or alternative non-limiting embodiment of the present invention, there is provided a novel solar panel mounting system for solar panels on a standing seam roofing system. The standing seam roofing system is generally a metal roofing system; however, this is not required. Three non-limiting examples of standing seam roofing systems are disclosed in U.S. Pat. Nos. 4,649,684 and 6,354,045, and U.S. Provisional Patent Application Ser. No. 61/183,728 filed Jun. 3, 2009, all of which are incorporated herein by reference. In common standing seem roofing systems, the side edges of the roofing panels are bent to form a side flange, and the side flanges are mounted to a bracket that is secured to a roof substrate. The two side flanges of the roof panel form a generally U-shaped cross-sectional profile. In one non-limiting embodiment of the invention, a flexible or non-flexible solar panel can be inserted between the two side flanges of the roof panel and be held in place by a modified cap members. Generally, the cap member is used to secure the flanges of two adjacently positioned roof panels to the bracket or anchoring clip; however, this is not required. In another and/or alternative non-limiting aspect of this embodiment, the cap member can be designed to be snapped and/or formed on the flanges and top portion of the bracket or anchoring clip as illustrated in U.S. Pat. Nos. 4,649,684 and 6,354,045, which are herein fully incorporated herein by reference, or can be designed to be slid onto the flanges and top portion of the anchoring clip as illustrated in U.S. Provisional Patent Application Ser. No. 61/183,728 filed Jun. 3, 2009, which is herein fully incorporated by reference. In still another and/or alternative non-limiting aspect of this embodiment, the cap member can be designed to include side legs that extend downwardly when cap member is connected to the side flanges and top portion of the bracket or anchoring clip. The length of the legs and the bottom portion of the legs can be designed to engage or be positioned closely adjacent to the top surface of a solar panel that is positioned between the two flanges of the roof panel so as to at least partially maintain the solar panel on the roof panel when the cap members are connected to the side flanges and top portion of the anchoring clip. In this non-limiting configuration, the side legs of the cap extend downwardly along the outer surface of the side flanges of the roofing and/or siding panels. The legs may or may not engage the outer surface of the side flanges of the roofing and/or siding panels. In one non-limiting aspect of this embodiment, the solar panels are non-flexible solar panels and the cap member is the primary component to maintain the solar panels on the roofing system. As can be appreciated, detachable connectors (e.g., Velcro, mushroom strip connectors, etc.) and/or non-detachable connectors (e.g., adhesive strips, adhesive, polyurethane coatings, etc.) can optionally be used to facilitate is securing the solar panels to the roofing and/or siding system. In yet another and/or alternative non-limiting aspect of this embodiment, the cap member can be designed to be removably connectable to the side flanges and/or bracket or anchoring clip; however, this is not required. In still another and/or alternative non-limiting embodiment of the invention, the ends of the legs of the cap member can include a rolled edge or a coating material (e.g., rubber coating, polymeric coating, etc.) so as to limit and reduce damage to the upper surface of the solar panels; however, this is not required. The cap members are generally formed of a durable material (e.g., metal, plastic, composite material, etc.). In still another and/or alternative non-limiting embodiment of the invention, the side legs of the cap member are bend outwardly so that the solar panels can be snapped and locked to the roofing or siding system. In this arrangement, the cap members can be pre-inserted so as to secure the side flanges of the panels to the bracket or anchoring clip. After the cap members are installed, the solar panels can be inserted onto the roofing and/or siding system. In one such arrangement, the solar panel is a non-flexible solar panel that is sized to fit between the two side flanges of the panel. As the solar panel is inserted into the region between the two side panels, the side edge of the side panels will eventually engage the legs of the cap members and push the legs toward the outer surface of the side flanges as the solar panel continues to be lowered between the side flanges of the panels. The ends of the legs of the cap members are spaced upwardly from the upper surface of the panels a sufficient distance so that when the solar panel engages the upper surface of the panels, the ends of the legs of the cap member can snap back into position and partially overlie the top surface of the solar panel, thereby securing the solar panel to the roofing and/or siding panels. Generally the ratio of the thickness of the solar panel to the spacing between the ends of the legs of the cap members and the upper surface of the roofing or siding panel is about 0.1-0.99:1, typically about 0.4-0.95:1, and more typically about 0.7-0.95:1. The ratio of the width of the solar panel to the distance between the two side flanges of the solar panel is generally about 0.75-0.99:1, typically about 0.8-0.95:1, and more typically about 0.85-0.9:1. In addition or alternatively, the distance between the ends of the legs of the cap members and the upper surface of solar panel is generally less than about 2 inches, typically less than about 1 inch, and more typically less than about 0.5 inches. The legs of the cap members that extend downwardly toward to upper surface of the roofing and/or siding panels can be formed along a portion or along the fully length of the cap member. When the cap members are removably connectable to the side flanges and top portion of the bracket or anchoring clip, the solar panels can be removably secured to the roof panel system; however, this is not required. As can be appreciated, many configurations of the cap member can be used to permanently or removably secure one or more solar panels to a paneled roof system.

In still yet another and/or alternative non-limiting embodiment of the present invention, there is provided an evaluation method for determining how to secure one or more solar panels to a roofing system. In one non-limiting method, the first step of the evaluation method is to determine the type of roofing system to be installed on a building or that exists on the building. If there is a pre-existing roof system, then it needs to be determined whether a solar panel system can be installed on the pre-existing roof system with or without modification to the pre-existing roof system or whether a new roofing material needs to be installed on the roof of the building. The roofing system must also be evaluated to determine whether it is a sloped or non-sloped roofing system. After the roof of the building is evaluated, the next step is to determine the type of solar panel that can be installed on the roof system. The strength of the roof of the building and the weather conditions (e.g., seasonal wind conditions, seasonal temperature changes, etc.) that the solar panels will be exposed to will be factors in the type of solar panel selected. Once the type of solar panel is selected, then the next step is to determine the connection arrangement to be used to connect the solar panels to the roof system. One factor that needs to be considered is whether the connection arrangement will be a releasable or non-releasable connection arrangement. Another factor that needs to be considered is whether an adhesion platform for the roofing system and/or the solar panel will be required. Still another factor is the type of connector to be used (e.g., size, shape, configuration of the connectors, etc.). Another factor to be considered is the connector strip pattern that is to be used on the top of the roof system and/or on the bottom of the solar panels.

One non-limiting object of the present invention is to provide an improved connection arrangement between a roofing system and a solar panel.

In another and/or alternative non-limiting objection of the present invention is to provide a connection arrangement that forms a releaseable or non-releasable connection between a solar panel and a roofing system.

In yet another and/or alternative non-limiting objection of the present invention is to provide a connection arrangement includes the use of adhesive tape to secure a solar panel to a roofing system.

In another and/or alternative non-limiting objection of the present invention is to provide a connection arrangement includes the use of an adhesion platform to improve the connection of a solar panel to a roofing system.

In still yet another and/or alternative aspect of the present invention is to connected solar panels to a roof of a building or other type of structure without having to reinforce the roof of the building or other type of structure.

In still another and/or alternative aspect of the present invention pertains to the manufacturing of solar panels and/or roofing and/or siding material that includes a connection arrangement and/or adhesion platform that can be used to connected solar panels to a roof of a building or other type of structure.

In still another and/or alternative aspect of the present invention pertains is to provide an anchoring clip for a paneled roof system that can be used to permanently or releasably secure one or more solar panels to a paneled roof system.

These and other objects and advantages will become apparent from the following description taken together with the accompanying drawings.

BRIEF DESCRIPTION OF THE DRAWINGS

Reference may now be made to the drawings, which illustrate several non-limiting embodiments that the invention may take in physical form and in certain parts and arrangements of parts wherein;

FIG. 1 illustrates an anchoring clip for a paneled roof system that is used to secure a solar panel to the paneled roof system;

FIGS. 2 and 3 are front views of two different leg profiles of an anchoring clip;

DESCRIPTION OF NON-LIMITING EMBODIMENTS OF THE INVENTION

Figure 4:
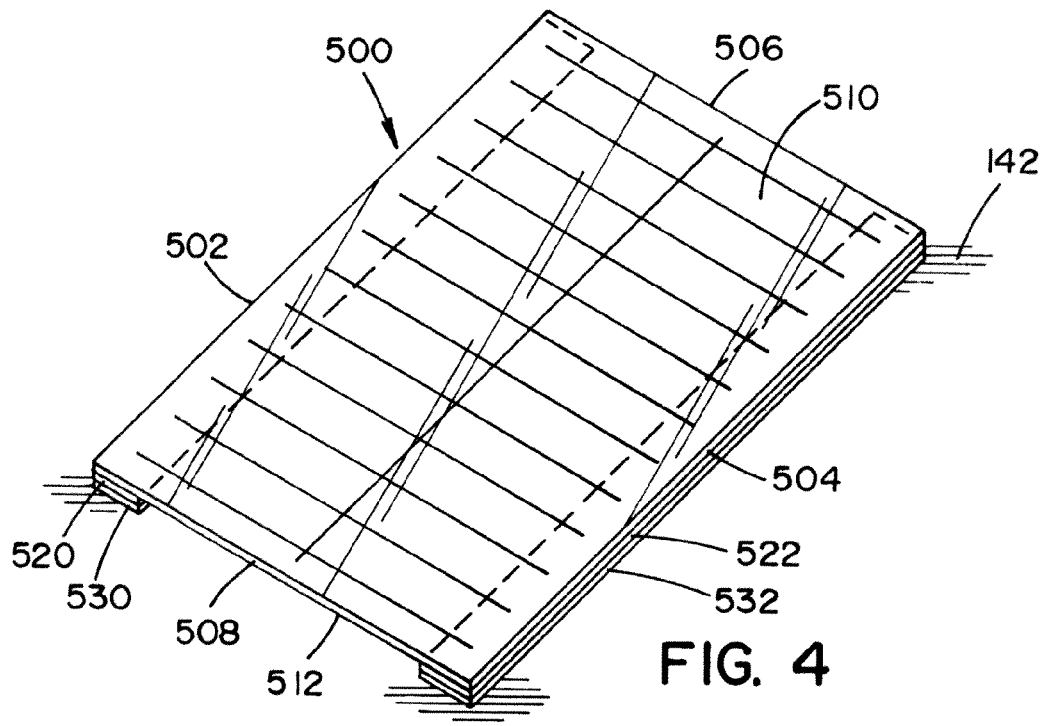
FIG. 4 illustrates a flexible solar panel that is connected to a roof system by use of strips of connection material.

Referring now to the drawings wherein the showings are for the purpose of illustrating non-limiting embodiments of the invention only and not for the purpose of limiting same, FIG. 1 illustrates a roof panel system 100 that is formed of a plurality of roof panels 110. The roof panels are generally formed of a metal material; however, this is not required. The roof panels include two side flanges 120, 130 and a base section 140 connected therebetween. The base section and side flanges form a generally U-shaped cross-sectional profile for each of the roof panels; however, other profiles can be formed. As can be appreciated, the configuration of the roof panel, side flanges of the roof panel, and base section of the roof panels in non-limiting. As also can be appreciated, the material used to form the roof panel is non-limiting. The side flanges 120, 130 generally have a shorter length than the base portion; however, this is not required.

An anchoring clip 200 is illustrated as being positioned between side flanges 120, 130 of two adjacently positioned roof panels. The anchoring clip can have many different configurations. Several non-limiting configurations of an anchoring clip that can be used in the present invention are illustrated in U.S. Pat. Nos. 4,649,684 and 6,354,045, and U.S. Provisional Patent Application Ser. No. 61/183,728 filed Jun. 3, 2009, and in all of the art cited therein. The anchoring clip is generally secured to a roof substrate R. The means by which the anchoring clip is secured to the roof substrate is non-limiting (e.g., nail, screw, adhesive, etc.). The manner in which the roof panel is configured and the manner in which the roof panels are positioned relative to the anchoring clips is also non-limiting; however, several configurations are illustrated in U.S. Pat. Nos. 4,649,684 and 6,354,045, and U.S. Provisional Patent Application Ser. No. 61/183,728 filed Jun. 3, 2009, and in all of the art cited therein, all of which are incorporated herein by reference.

As illustrated in FIG. 1, the upper end of the side flanges is bent to provide a groove 150 which opens outwardly laterally from the roofing panel. Each of the anchoring clips 200 has a pair of oppositely extending top flanges 210. These top flanges are positioned along a vertical web member 220 of the anchoring clip. Each of the top flanges are adapted to be received in the groove of one of a pair of adjacent roof panels. The anchoring clip can include a base flanges, not shown, that is adapted to fasten the substructure of a roof. A cap member 400 is used to retain the top flanges of the anchoring clip in the groove in the side flanges of the roofing panels. In this way there is no direct fastening of the roof panels to the substructure, thus relative movement of the roofing panels to the substructure of the roof is permitted.

The top flanges of the anchoring clip are designed to effectively bear the weight of the roof panels. The anchoring clip can include a pair of oppositely extending shelf members, not shown, one on each side of the vertical web, so that each shelf member is positioned below the base section of the roof panels when the top flange of the anchoring clip is received in the groove on the side flanges of the roofing panel; however, this is not required.

Positioned between the side flanges on or above the top surface of the base section of the roof panels is a solar panel 300. The solar panel can be a flexible or non-flexible solar panel. The bottom surface of the solar panel can be connected to the roof panel by a releasable connection arrangement (e.g., 3M Dual Lock, Velcro, etc.), or a non-releasable connection arrangement (e.g., adhesive, adhesive strip, bitumen coatings, polyurethane coatings, rivet, stitching, staple, nail, screw, etc., etc.); however, this is not required.

FIG. 4 illustrates a flexible solar panel 500 that is connected to a top surface 142 of base section 140 of roof panel 110. The type of flexible solar panel is non-limiting. The size, shape, thickness, etc. of the flexible solar panel is also non-limiting. The flexible solar panel 500 has a generally rectangular shape and has two longitudinal side edges 502, 504 and two end edges 506, 508. The longitudinal edges are illustrated as being longer than the end edges. The flexible solar panel also has a top surface 510 and a bottom surface 512. The top surface of the flexible solar panel typically includes one or more photovoltaic cells. The configuration, composition, size, shape, etc. of the one or more photovoltaic cells is non-limiting. The one or more photovoltaic cells are generally connected together by various means. The manufacture and configuration of flexible solar panels that can be used in the present invention will not be further described since such details regarding the manufacture, configuration, composition, size, shape, etc. of flexible solar panels are included in the patents, patent publication, patent applications and articles that are incorporated herein by reference.

Two strips of connection material 520, 522 are illustrated as being connected to the bottom surface 512 of the flexible solar panel and at or adjacent to the two longitudinal side edges 502, 504 of the flexible solar panel. Also, two strips of connection material 530, 532 are illustrated as being connected to the top surface 142 of base section 140 of roof panel 110. The use of one or more strips of connection material to facilitate in securing the solar panel on the roof panel is optional. The strips of connection material 520, 522 can be connected to the bottom surface 512 of the flexible solar panel in a variety of ways (e.g., adhesive, hot melt, bitumen coatings, polyurethane coatings, stitching, rivets, staples, etc.). Likewise, the strips of connection material 530, 532 can be connected to the top surface 142 of base section 140 of roof panel 110 in a variety of ways (e.g., adhesive, hot melt, bitumen coatings, polyurethane coatings, stitching, rivets, staples, tacks, nails, screws, etc.). The manner in which the connection material is connected to the flexible solar panel and/or roof panel is non-limiting. The strips of connection material 520, 522 are illustrated as being generally aligned with the two longitudinal side edges 502, 504 of the flexible solar panel along the longitudinal length of the flexible solar panel; however, it can be appreciated that a portion of one or both of strips of connection material 520, 522 can extend outwardly from (i.e., overlap) one or both longitudinal side edges 502, 504 of the flexible solar panel along one or more portions of the longitudinal length of the flexible solar panel, and/or a portion of one or both of strips of connection material can be spaced inwardly from one or both longitudinal side edges of the flexible solar panel along one or more portions of the longitudinal length of the flexible solar panel. As also illustrated in FIG. 4, the strips of connection material 520, 522 are illustrated as continuous strips; however, it can be appreciated that one or both strips may not be continuous along the longitudinal length of the flexible solar panel. As also illustrated in FIG. 4, the strips of connection material 520, 522 are illustrated as terminating at the two end edges 506, 508 of the solar panel; however, it can be appreciated that one or both strips can terminate at some spaced distance inwardly from two end edges of the solar panel, or can extend beyond one or both edges. The strips of connection material 520, 522, 530, 532 are illustrated has having a rectangular shape and having a generally constant thickness along the longitudinal length of the strip; however, it can be appreciated that one or both strips can have a non-rectangular shape and/or a non-constant thickness along the longitudinal length of one or both strips. The width of strips of connection material 520, 522, 530, 532 are illustrated as being the same; however, this is not required. The width of strips of connection material 520, 522, 530, 532 are also illustrated as being less than the width of the flexible solar panel; however, this is not required. As can be appreciated, one strip of connection or two or more strips of connection material can be connected to the solar panel and/or roof panel.

Figure 5:
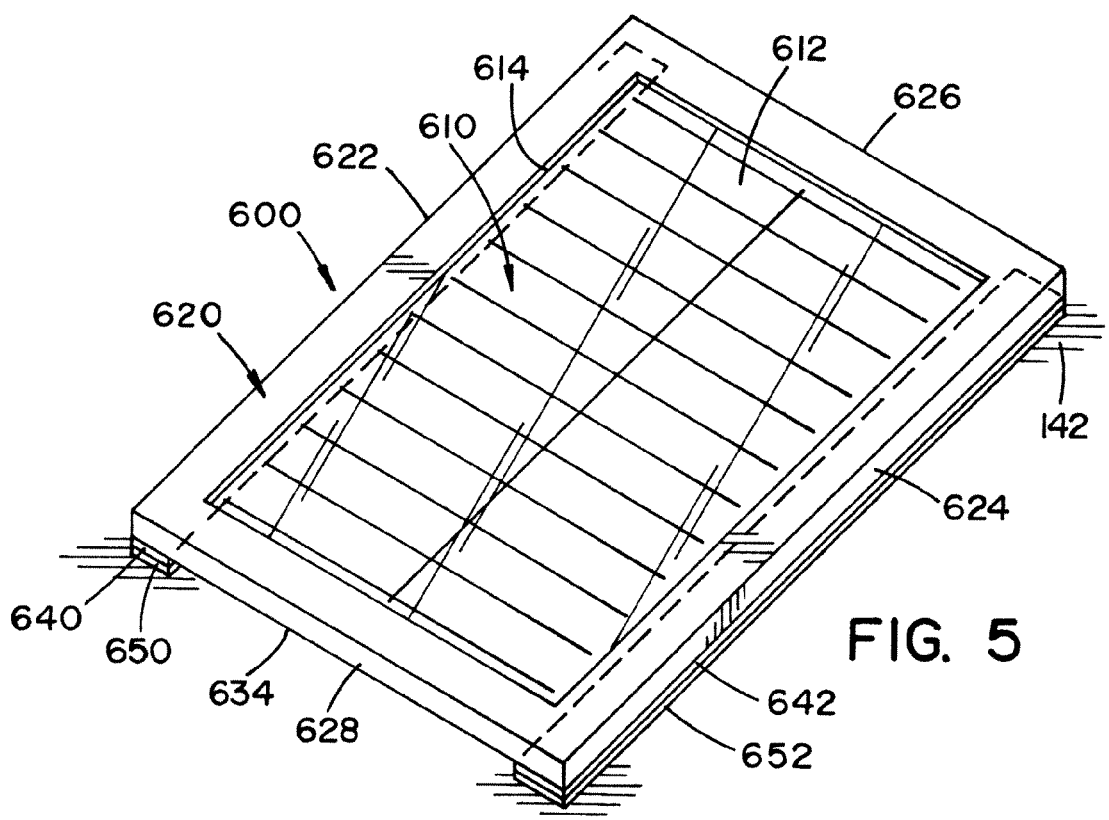
FIG. 5 illustrates a non-flexible solar panel that is connected to a roof system by use of strips of connection material.

Referring now to FIG. 5, solar panel 600 is a non-flexible solar panel. The type of non-flexible solar panel that can be used in the present invention is non-limiting. The size, shape, thickness, etc. of the non-flexible solar panel that can be used in the present invention is also non-limiting. As illustrated in FIG. 5, the non-flexible solar panel 600 includes a generally rigid plate 610 and a frame 620 that is connected to the peripheral edge 614 of rigid plate 610. The generally rigid plate 610 and the frame 620 have a generally rectangular shape; however, this is not required. As can be appreciated, some non-flexible solar panels may not include a frame. For purposes of describing one non-limiting embodiment of the invention, the non-flexible solar panel will be described as including a frame. As will be described in more detail below, one or more strips of connection material can be connected to a bottom surface of the frame so that the non-flexible solar panel can be connected to a roof panel; however, the use of connection material is optional. It will be appreciated that for non-flexible solar panels that do not include a frame or do not include a frame about the complete peripheral edge of the rigid plate, the one or more strips of connection material, when used, can be connected to the bottom surface of the rigid plate. The rigid plate 610 has a top surface 612 that typically includes one or more photovoltaic cells. The configuration, composition, size, shape, etc. of the one or more photovoltaic cells is non-limiting. The one or more photovoltaic cells are generally connected together by various means. The manufacture and configuration of rigid plate 610 that can be used in the present invention will not be further described since such details regarding the manufacture, configuration, composition, size, shape, etc. of rigid plate 610 are included in the patents, patent publication, patent applications and articles that are incorporated herein by reference. Frame 620 of non-flexible solar panel 600 has two longitudinal side edges 622, 624, two end edges 626, 628, and a bottom surface 634. The longitudinal edges are illustrated as being longer than the end edges; however, this is not required. Two strips of connection material 640, 642 are illustrated as being connected to the bottom surface 634 of frame 620 of non-flexible solar panel 600 and at or adjacent to the two longitudinal side edges 622, 624 of the frame. Also, two strips of connection material 650, 652 are illustrated as being connected to the top surface 142 of base section 140 of roof panel 110. The strips of connection material 640, 642 can be connected to the bottom surface 634 of the frame 620 in a variety of ways (e.g., adhesive, hot melt, bitumen coatings, polyurethane coatings, stitching, rivets, staples, etc.). Likewise, the strips of connection material 650, 652 can be connected to the top surface 142 of base section 140 of roof panel 110 in a variety of ways (e.g., adhesive, hot melt, bitumen coatings, polyurethane coatings, stitching, rivets, staples, tacks, nails, screws, etc.). The manner in which the connection material is connected to the frame of the non-flexible solar panel and/or roof system is non-limiting. Generally, the type of means used to connect the connection material to the frame of the non-flexible solar panel and/or roof system is selected so that the connection material stays connected to the frame of the non-flexible solar panel and/or roof system. The strips of connection material 640, 642 are illustrated as being generally aligned with the two longitudinal side edges 622, 624 of the frame of the non-flexible solar panel along the longitudinal length of the frame; however, it can be appreciated that a portion of one or both of strips of connection material 640, 642 can extend outwardly (i.e., overlap) from one or both longitudinal side edges 622, 624 of the frame along one or more portions of the longitudinal length of the frame, and/or a portion of one or both of strips of connection material 640, 642 can be spaced inwardly from one or both longitudinal side edges 622, 624 of the frame along one or more portions of the longitudinal length of the frame. As also illustrated in FIG. 5, the strips of connection material 640, 642 are illustrated as continuous strips; however, it can be appreciated that one or both strips may not be continuous along the longitudinal length of frame 620. As also illustrated in FIG. 5, the strips of connection material 640, 642 are illustrated as terminating at the two end edges 626, 628 of frame 620; however, it can be appreciated that one or both strips can terminate at some spaced distance from two end edges 626, 628 of the frame, or extend beyond one or more of the end edges. The strips of connection material 640, 642, 650, 652 are illustrated has having a rectangular shape and having a generally constant thickness along the longitudinal length of the strip; however, it can be appreciated that one or both strips can have a non-rectangular shape and/or a non-constant thickness along the longitudinal length of one or both strips. The width of strips of connection material 640, 642, 650, 652 are illustrated as being the same; however, this is not required. The width of strips of connection material 640, 642, 650, 652 are also illustrated as being less than the width of the flexible solar panel; however, this is not required. As can be appreciated, one strip of connection or two or more strips of connection material can be connected to the solar panel and/or roof panel.

As illustrated in FIGS. 4 and 5, strips 530, 532, 650, 652 are connected to top surface 142 of base section 140 of roof panel 110 so that the strips will at least partially align with strips 520, 522, 640, 642 on the solar panel when the solar panel is connected to the roof panel. As illustrated in FIGS. 4 and 5, the strips on the solar panel and roof panel are exactly aligned with one another when the solar panel is connected to the roof panel; however, it can be appreciated that the strips do not have to be exactly aligned with one another. The connection between the one or more connection strips on the solar panel and the one or more connection strips, when such connection strips are used, can be a releasable connection (e.g., Velcro, mushroom connectors, etc.) or a non-releasable connection (e.g., adhesive, hot melt, bitumen coatings, polyurethane coatings, etc.).

Figure 6:
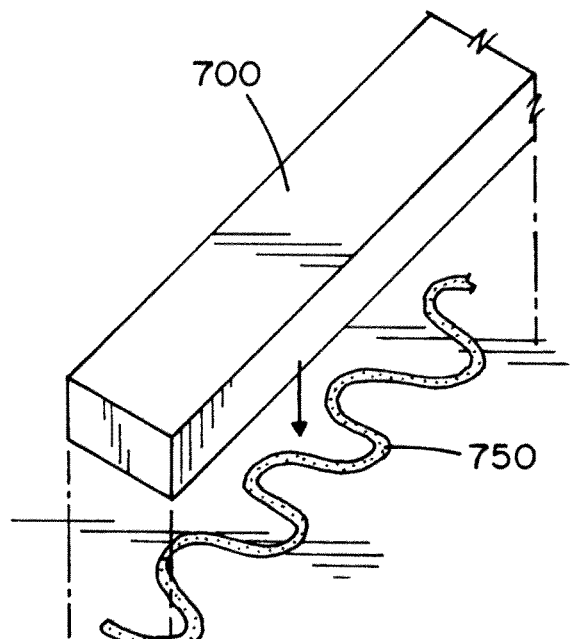
FIG. 6 illustrates an adhesive material that is used to connect a strip of foundation strip or adhesion platform to a top surface of a roof panel.

Referring now to FIG. 6, there is illustrated a foundation strip or adhesion platform 700 that can be used to enhance or improve the connection of a strip of connection material to the solar panel and/or the roof system. The use of a connection material and/or adhesion platform is optional. The size, shape, thickness and composition of the adhesion platform, when used, is non-limiting. As illustrated in FIG. 6, the adhesion platform has a generally rectangular cross-section shape; however, this is not required. The thickness of the adhesion platform along the longitudinal length is illustrated as generally constant; however, this is not required. The type of adhesive/bonding material 750 used to connect the foundation strip or adhesion platform 700 to the top surface 142 of base section 140 of roof panel 110 is also non-limiting. As illustrated in FIG. 6, the adhesive/bonding material is illustrated as being first placed on the roof panel prior to connecting the foundation strip or adhesion platform 700 to the roof panel. As can be appreciated, the adhesive/bonding material can be first placed on the bottom of the foundation strip or adhesion platform 700 prior to connecting the foundation strip or adhesion platform 700 to the roof panel. As can also be appreciated, the adhesive/bonding material can be first placed on the bottom of the foundation strip or adhesion platform 700 and on the roof panel prior to connecting the foundation strip or adhesion platform 700 to the roof panel. Furthermore, it can be appreciated that the bottom surface of the foundation strip or adhesion platform 700 can include an pre-applied adhesive/bonding material backing during the manufacture of the foundation strip or adhesion platform 700. Adhesive/bonding material 750 is illustrated as being in a liquid form that is applied to the surface of the roof panel, however, it can be appreciated that the adhesive/bonding material could be an adhesive strip.

Figure 7:
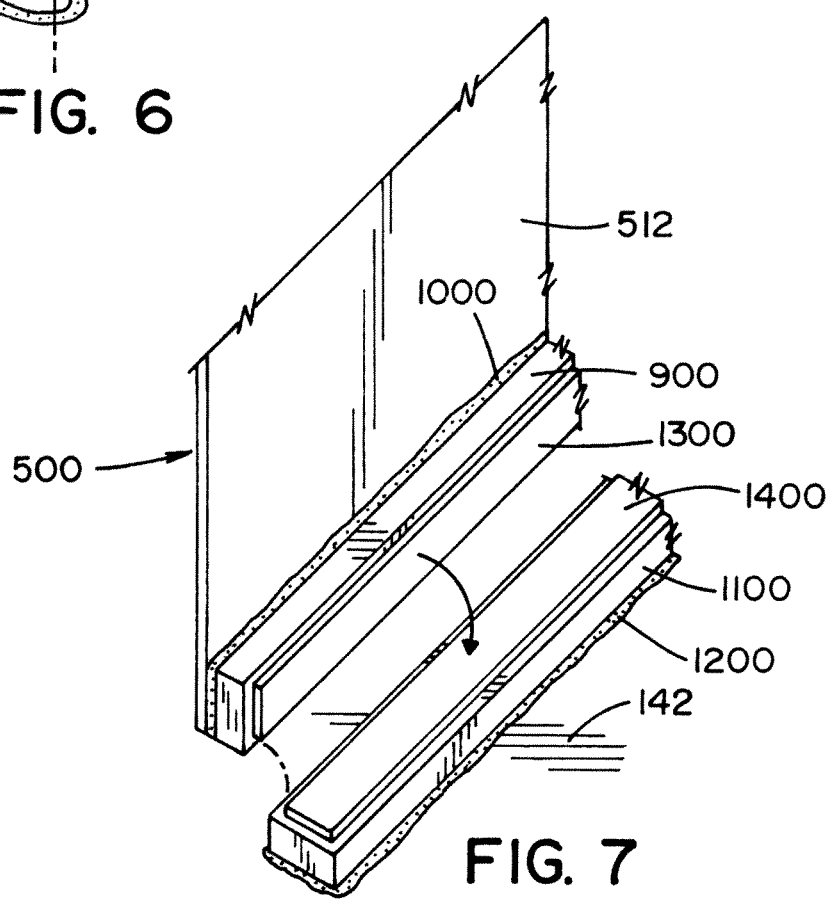
FIG. 7 illustrates a solar panel that is connected to a roof system by use of strips of connection material wherein the solar panel includes strips of foundation strip or adhesion platform connected to the bottom surface of the solar panel by an adhesive/bonding material and the top surface of a roof includes strips of foundation strip or adhesion platform connected to the roof system by an adhesive/bonding material, and the top surface of the strips of foundation strip or adhesion platform includes strips of connection material.

Referring now to FIG. 7, an adhesion platform 900 is illustrated as being connected to the bottom surface 512 of flexible solar panel 500 and another adhesion platform 1100 is connected to the top surface 142 of base section 140 of roof panel 110. As can be appreciated, the solar panel can be a non-flexible solar panel. As also can be appreciated, when the adhesion platform is used, the adhesion platform may be used on both the roof panel and the solar panel, or may be only used on the solar panel or the roof panel. As illustrated in FIG. 7, an adhesive layer 1000 is used to connect the bottom surface of adhesion platform 900 to the bottom surface 512 of the flexible solar panel 500. An adhesive layer 1200 is illustrated as being used to connect the bottom surface of adhesion platform 1100 to the top surface 142 of base section 140 of roof panel 110. The types of materials used for adhesive layers 1000, 1200 can be the same or different. The thickness of the adhesive layers 1000, 1200 can be the same or different. Connected to the top surface of adhesion platform 900 is a strip of connection material 1300. Likewise, connected to the top surface of adhesion platform 1100 is a strip of connection material 1400. The connection strip can be used to form a releasable or non-releasable connection between the solar panel and the roof panel. The use of the adhesion platform and/or connection strip on the solar panel and/or roof panel is optional. The connection material can be in the form of a strip of material and/or merely be an adhesive/bonding material. When a strip of connection material is used, the strip of connection material can be connected to the adhesion platform on the solar panel and/or the roof system. The strip of connection material, when used, can be connected to the adhesion platform in a variety of ways (e.g., adhesive, bitumen coatings, polyurethane coatings, rivet, stitching, staple, nail, screw, etc.). When an adhesive is used, the adhesive can be the same or different as adhesive 750, 1000, 1200 as illustrated in FIGS. 6 and 7. As illustrated in FIG. 7, the width of the adhesion platform is greater than the width of the strip of connection material; however, it can be appreciated that the width of the adhesion platform can be the same or smaller than the width of the strip of connection material. As also illustrated in FIG. 7, the thickness of the adhesion platform is greater than the thickness of the strip of connection material; however, it can be appreciated that the thickness of the adhesion platform can be the same or smaller than the thickness of the strip of connection material. As also illustrated in FIG. 7, the length of the adhesion platform is greater than the length of the strip of connection material; however, the length of the adhesion platform can be the same or less than the length of the strip of connection material.

Figure 8:
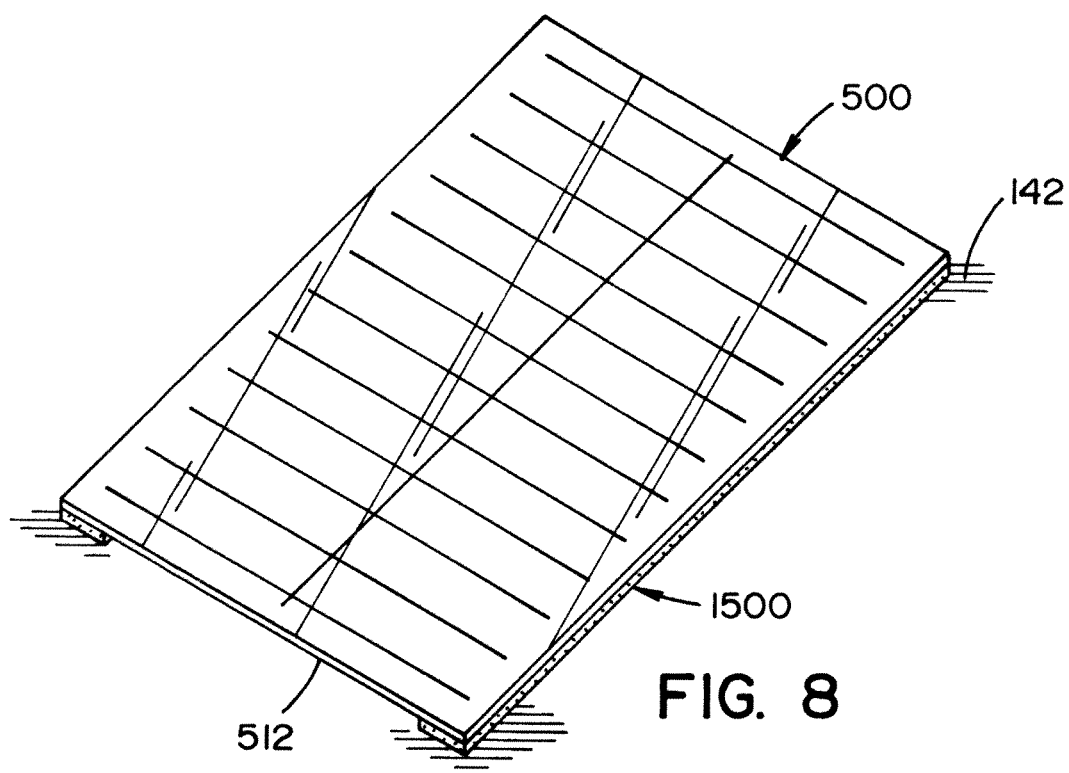
FIG. 8 illustrates a double sided adhesive material that is used to connect a solar panel to a top surface of a roof system; and, FIG. 9 illustrates a double sided adhesive material that includes removable film on each side of the double sided adhesive material.
Figure 9:
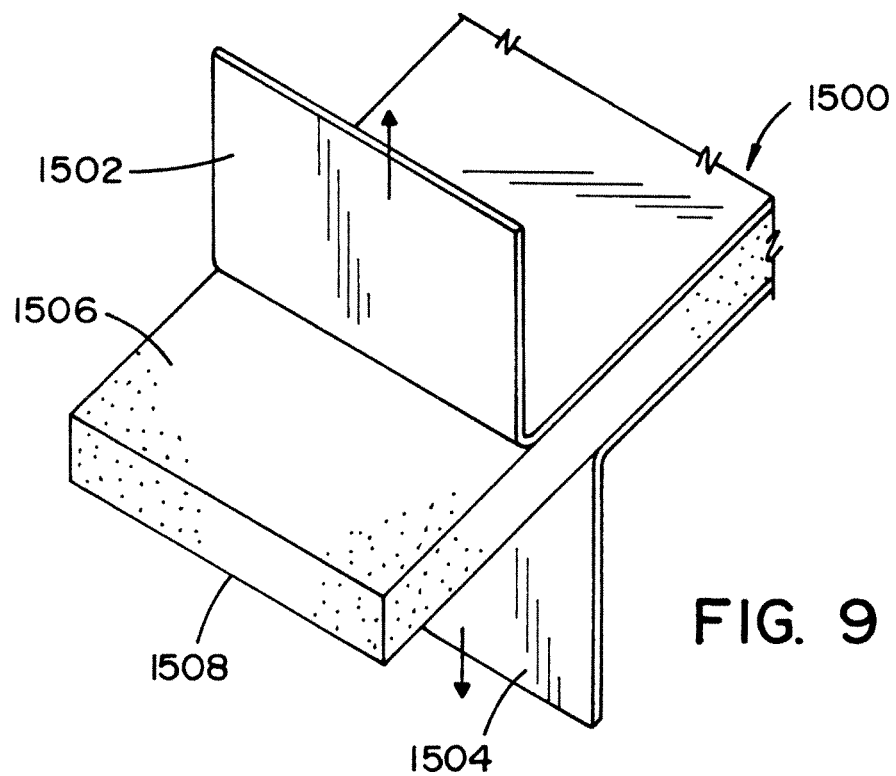

Referring now to FIGS. 8 and 9, there is illustrated a flexible solar panel 500 that is connected to the top surface 142 of base section 140 of roof panel 110. As can be appreciated, the solar panel can be a non-flexible solar panel. Connected to the bottom surface 512 of the solar panel is one or more strips of double sided adhesive strip 1500. The use of adhesive strip 1500 is optional. The type of adhesive that is used on the sides of the double sided adhesive strip is non-limiting. The adhesives on the sides of the double sided adhesive strip can be the same or different. The adhesives on the sides of the double sided adhesive strip can have the same or different thickness. The thickness and width of the double sided adhesive strip is non-limiting. As illustrated in FIG. 8, two strips of double sided adhesive strip are connected to the bottom surface 512 of the solar panel; however, it can be appreciated that one strip or more than two strips of double sided adhesive strip can be connected to the bottom surface 512 of the solar panel. The width of the two strips of double sided adhesive strip are illustrated as being narrower than the width of the solar panel; however, this is not required. The width of the strip of double sided adhesive strip can be equal to or greater than the width of the solar panel. In such a configuration, the bottom surface of the solar panel typically includes only a single strip of double sided adhesive strip. The strips of double sided adhesive strip are illustrated as being generally aligned with the two longitudinal side edges the solar panel along the longitudinal length of the flexible solar panel; however, it can be appreciated that a portion of one or both of strips of double sided adhesive strip can extend outwardly (i.e., overlap) from one or both longitudinal side edges of the solar panel along one or more portion of the longitudinal length of the solar panel, and/or a portion of one or both of strips of double sided adhesive strip can be spaced inwardly from one or both longitudinal side edges of the solar panel along one or more portion of the longitudinal length of the solar panel. As also illustrated in FIG. 8, the strips of double sided adhesive strip are illustrated as continuous strips; however, it can be appreciated that one or both strips may not be continuous along the longitudinal length of the solar panel. As also illustrated in FIG. 8, the strips of double sided adhesive strip are illustrated as terminating at the two end edges of the solar panel; however, it can be appreciated that one or both strips can terminate at some inwardly spaced distance from one or both end edges of the solar panel, or extend beyond one or both of the end edges of the solar panel. One non-limiting type of strip of double sided adhesive strip 1500 is illustrated in FIG. 9. The strip of double sided adhesive strip is shown to include a removable film 1502, 1504 that is releasably connected to the top and bottom sides 1506, 1508 of the strip of double sided adhesive strip. The type of material used for the removable film is non-limiting. In practice, removable film 1502 can be remove to expose the adhesive surface on the top side 1506 of the strip of double sided adhesive strip so that the top side can be connected to the bottom side of a solar panel or frame or a solar panel, the surface of an adhesion platform that is connected to a solar panel, the surface of an adhesion platform that is connected to a roof panel, or the top surface of a roof panel. Once the top side of the strip of double sided adhesive strip has been connected to a surface, removable film 1504 can be remove to exposed the adhesive surface on the bottom side 1508 the strip of double sided adhesive strip. The adhesive surface on the bottom side of the strip of double sided adhesive strip can then be connected to the bottom side of a solar panel or frame or a solar panel, the surface of an adhesion platform that is connected to a solar panel, the surface of an adhesion platform that is connected to the roof panel, or the top surface of the roof panel so as to connect the solar panel to the roof panel. As can be appreciated, both removable films can be removed from the strip of double sided adhesive strip prior to connecting either side of the strip of double sided adhesive strip to a surface. As can also be appreciated, the strip of double sided adhesive strip can be pre-applied to a solar panel and/or roof panel prior to transporting the solar panel and/or roof panel to the site that the solar panels are to be connected to a roofing system.

Referring now to FIGS. 1-3, cap members 400 are illustrated as securing the flanges of the roof panels to the anchoring clips 200. The manner in which the cap members are secured to the roof panels and/or anchoring clips is non-limiting; however, several configurations are illustrated in U.S. Pat. Nos. 4,649,684 and 6,354,045, and U.S. Provisional Patent Application Ser. No. 61/183,728 filed Jun. 3, 2009, and in all of the art cited therein. The cap members 400 are illustrated as including a top portion 410 and two side legs 420, 430. The side legs are illustrated as extending downwardly from the top portion and terminating on or closely above the top surface 310 of the solar panels 300. The end portion 440 of the side legs is designed to facilitate in maintaining the solar panels on the top surface of the base section of the roof panels. FIG. 1 illustrates that the bottom of the end portion 440 is in contact with the top surface of the solar panel when the cap member is connected to the flanges of the roof panels; however, it will be appreciated that end portion 440 can be spaced above the top surface of the solar panel when the cap member is connected to the flanges of the roof panels. Generally the end portion of the lowest downwardly extending side leg is positioned no more than about 3 inches above the top surface 310 of the solar panel when the solar panel is positioned between side flanges 120, 130 of panel 110, typically no more than about 2 inches, more typically about 0-1.5 inches, even more typically about 0-1 inch, still more typically about 0-0.5 inch, and even more typically about 0-0.25 inch.

The end portion 440 of the side legs optionally includes a sloped member that can be used to facilitate in maintaining solar panels 300 on the top surface 142 of the base section of the roof panels; however, this is not required. Also or alternatively, sloped member on the end portion 440 can be designed to enable the solar panels to be snapped into position on the top surface of the base section of the roof panels after the cap members are already connected to the flanges and top portion of the anchoring clip; however, this is not required. When the cap members 400 are designed to allow a non-flexible solar panel to be secured to the roof system after the cap members are connected to adjacently positioned side flange 120, 130, width of the solar is selected to be less than the width between side flanges 120, 130 on each roof panel 110 so that the solar panel can be easily fit between side flanges 120, 130 and also be able to move past the side legs when the side legs are passed toward the side flanges 120, 130 as the solar panel is positioned and secured on to the roof panel. Generally, the ratio of the width of the solar panel to the width between the two side flanges of a roof panel is about 0.7-0.99:1, typically about 0.8-0.98:1 and more typically about 0.8-0.95:1. In addition, side legs 420, 430 can be designed so as to slope away from adjacently positioned side flanges 120, 130 when the cap member is connected to the side flanges. FIG. 1 illustrates that the side legs maintain a generally constant spacing from the side flange. When the side legs are designed to slope away from the side flanges, the slope is such that the portion of the side leg that is closest to the end portion 440 is positioned farther from the side flanges than the portion of the side leg that is positioned closer top portion 410 of the cap member when the cap member is connected to the adjacently positioned side flanges.

As illustrated in FIG. 1, the side legs or the lower portion of the side legs can be bent so as to facilitate in the snap locking and/or retaining of the of the solar panel on the roofing panels; however, this is not required. If the cap member is designed to be removably connected to the flanges and top portion of the anchoring clip, the solar panels can be designed to be removably secured to the roof panels; however, this is not required. Although not shown, insulation (e.g., insulation blocks, etc.) can be placed under the solar panels and/or under the roofing panels to increase the insulation properties of the roofing system; however, this is not required. As set forth above, a connection material and/or adhesion plat form as illustrated in FIGS. 4-9 can be used in combinations with the cap members to releasably or non-releasably connected solar panels 300 to roof panel 110; however, this is not required.

Referring again to FIGS. 2 and 3, two non-limiting designs of the cap member are illustrated. In FIG. 2, the side legs 420, 430 extend along the full longitudinal length of the cap member. In FIG. 3, the side legs 420, 430 extend only partially along the longitudinal length of the cap member. As can be appreciated, each side of the cap member can include more than one side leg.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

We claim:

1. A solar roof system that comprises a roof panel, a solar panel, an anchoring clip and a panel connector, said roof panel includes first and second side flanges and a base connected between said first and second flanges, said solar panel positioned on or above a top surface of said base of said roof panel and between said first and second side flanges of said roof panel, said anchoring clip including a top portion and a base portion, said top portion designed to be connected to said first side flange, said base portion designed to be connected to a roof substrate, said panel connector designed to maintain said solar panel on or above a top surface of said base of said roof panel and between said first and second flanges, said panel connector designed to maintain a connection of said first side flange to said top portion of said anchoring clip, at least a portion of said panel connector positioned over said solar panel while said panel connector maintains a connection of said first side flange to said top portion of said anchoring clip, said panel connector includes a cap member designed to secure said first flange of said roof panel to said top portion of said anchoring clip, said cap member including a cap portion and a side leg extending downwardly from said cap portion, said side leg having a lower end that is positioned on or above at least a portion of said upper surface of said solar panel while said panel connector maintains said connection of said first side flange to said top portion of said anchoring clip, said lower end of said side leg designed to inhibit or prevent said solar panel from being removed from between said first and second side flanges while said panel connector maintains said connection of said first side flange to said top portion of said anchoring clip, said lower end of said side leg spaced from said first flange of said roof panel after said solar panel is positioned on or above a top surface of said base of said roof panel, said lower end of said side leg designed to move toward said first flange of said roof panel as said solar panel is moved past said lower end of said side leg, said lower end of said side leg designed to move away said first flange of said roof panel once said solar panel is moved below said lower end of said side leg and installed on or above a top surface of said base of said roof panel.

2. The solar panel system as defined in claim 1, wherein said solar panel has an upper surface, said upper surface positioned below a top portion of said first and second flanges while said panel connector maintains said connection of said first side flange to said top portion of said anchoring clip.

3. The solar panel system as defined in claim 1, wherein said panel connector releasably maintains said solar panel on or above said top surface of said base of said roof panel, said solar panel removably maintained on said top surface of said base of said roof panel while said panel connector maintains said connection of said first side flange to said top portion of said anchoring clip.

4. The solar panel system as defined in claim 2, wherein said panel connector releasably maintains said solar panel on or above said top surface of said base of said roof panel, said solar panel removably maintained on said top surface of said base of said roof panel while said panel connector maintains said connection of said first side flange to said top portion of said anchoring clip.

5. The solar panel system as defined in claim 3, wherein said solar panel is a non-flexible solar panel.

6. The solar panel system as defined in claim 5, wherein said side leg of said cap member slopes outwardly from said first flange while said panel connector maintains said connection of said first side flange to said top portion of said anchoring clip.

7. The solar panel system as defined in claim 6, wherein said top portion of said anchoring clip includes a top flange portion and said first side flange includes a groove, said top flange portion designed to engage said groove in first side flange while said panel connector maintains said connection of said first side flange to said top portion of said anchoring clip.

8. The solar panel system as defined in claim 7, wherein solar panel includes a lower surface, said lower surface of said solar panel, said top surface of said base of said roof panel, or combinations thereof including a connector designed to releasably connect said lower surface of said solar panel to said top surface of said base of said roof panel.

9. The solar panel system as defined in claim 1, wherein said solar panel is a non-flexible solar panel.

10. The solar panel system as defined in claim 1, wherein said side leg of said cap member slopes outwardly from said first flange while said panel connector maintains said connection of said first side flange to said top portion of said anchoring clip.

11. The solar panel system as defined in claim 1, wherein said top portion of said anchoring clip includes a top flange portion and said first side flange includes a groove, said top flange portion designed to engage said groove in first side flange while said panel connector maintains said connection of said first side flange to said top portion of said anchoring clip.

12. The solar panel system as defined in claim 1, wherein solar panel includes a lower surface, said lower surface of said solar panel, said top surface of said base of said roof panel, or combinations thereof including a connector designed to releasably connect said lower surface of said solar panel to said top surface of said base of said roof panel.

13. A solar roof system that comprises a roof panel, a solar panel, an anchoring clip and a panel connector,
    said roof panel includes first and second side flanges and a base connected between said first and second flanges,
    said solar panel positioned on or above a top surface of said base of said roof panel and between said first and second side flanges of said roof panel,
    said anchoring clip including a top portion and a base portion, said top portion designed to be connected to said first side flange, said base portion designed to be connected to a roof substrate,
    said panel connector designed to maintain said solar panel on or above a top surface of said base of said roof panel and between said first and second flanges, said panel connector designed to maintain a connection of said first side flange to said top portion of said anchoring clip, at least a portion of said panel connector positioned over said solar panel while said panel connector maintains a connection of said first side flange to said top portion of said anchoring clip, said solar panel having an upper surface, said upper surface positioned below a top portion of said first and second flanges,
    said panel connector including a cap member designed to secure said first flange of said roof panel to said top portion of said anchoring clip,
    said cap member including a cap portion and a side leg extending downwardly from said cap portion, said side leg having a lower end that is positioned on or above at least a portion of said upper surface of said solar panel while said panel connector maintains said connection of said first side flange to said top portion of said anchoring clip, said lower end of said side leg designed to inhibit or prevent said solar panel from being removed from between said first and second side flanges while said panel connector maintains said connection of said first side flange to said top portion of said anchoring clip, said lower end of said side leg spaced from said first flange of said roof panel after said solar panel is positioned on or above a top surface of said base of said roof panel, said lower end of said side leg designed to move toward said first flange of said roof panel as said solar panel is moved past said lower end of said side leg, said lower end of said side leg designed to move away said first flange of said roof panel once said solar panel is moved below said lower end of said side leg and installed on or above a top surface of said base of said roof panel.

14. The solar panel system as defined in claim 13, wherein a bottom portion of said side leg of said cap member slopes outwardly from said first flange while said panel connector maintains said connection of said first side flange to said top portion of said anchoring clip.

15. The solar panel system as defined in claim 14, wherein said panel connector releasably maintains said solar panel on or above said top surface of said base of said roof panel, said solar panel removably maintained on said top surface of said base of said roof panel while said panel connector maintains said connection of said first side flange to said top portion of said anchoring clip.

16. The solar panel system as defined in claim 13, wherein said panel connector releasably maintains said solar panel on or above said top surface of said base of said roof panel, said solar panel removably maintained on said top surface of said base of said roof panel while said panel connector maintains said connection of said first side flange to said top portion of said anchoring clip.

17. The solar panel system as defined in claim 13, wherein said solar panel includes a lower surface, said lower surface of said solar panel, said top surface of said base of said roof panel, or combinations thereof including a connector designed to releasably connect said lower surface of said solar panel to said top surface of said base of said roof panel.

18. The solar panel system as defined in claim 17, wherein said solar panel includes a lower surface, said lower surface of said solar panel, said top surface of said base of said roof panel, or combinations thereof including a connector designed to releasably connect said lower surface of said solar panel to said top surface of said base of said roof panel.

19. The solar panel system as defined in claim 18, wherein said top portion of said anchoring clip includes a top flange portion and said first side flange includes a groove, said top flange portion designed to engage said groove in first side flange while said panel connector maintains said connection of said first side flange to said top portion of said anchoring clip.

20. The solar panel system as defined in claim 13, wherein said top portion of said anchoring clip includes a top flange portion and said first side flange includes a groove, said top flange portion designed to engage said groove in first side flange while said panel connector maintains said connection of said first side flange to said top portion of said anchoring clip.

* * * * *